US012573975B2

(12) United States Patent
Tarkiainen et al.

(10) Patent No.: US 12,573,975 B2
(45) Date of Patent: Mar. 10, 2026

(54) CONVERTER AND A METHOD FOR DRIVING AN ELECTRIC MACHINE

(71) Applicant: Danfoss Editron Oy, Lappeenranta (FI)

(72) Inventors: Antti Tarkiainen, Lappeenranta (FI); Juha Toikka, Lappeenranta (FI); Tapani Siivo, Lappeenranta (FI); Mikko Piispanen, Lappeenranta (FI); Mika Björkholm, Lappeenranta (FI)

(73) Assignee: DANFOSS EDITRON OY, Lappeenranta (FI)

( * ) Notice: Subject to any disclaimer, the term of this patent is extended or adjusted under 35 U.S.C. 154(b) by 169 days.

(21) Appl. No.: 18/255,201

(22) PCT Filed: Nov. 20, 2021

(86) PCT No.: PCT/EP2021/082387
§ 371 (c)(1),
(2) Date: May 31, 2023

(87) PCT Pub. No.: WO2022/117372
PCT Pub. Date: Jun. 9, 2022

(65) Prior Publication Data
US 2024/0007039 A1     Jan. 4, 2024

(30) Foreign Application Priority Data

Dec. 4, 2020     (EP) ...................................... 20211735

(51) Int. Cl.
H02P 1/00          (2006.01)
H02K 3/28          (2006.01)
(Continued)

(52) U.S. Cl.
CPC ............. H02P 25/182 (2013.01); H02K 3/28 (2013.01); H02P 27/06 (2013.01)

(58) Field of Classification Search
CPC ............ H02P 25/182; H02P 1/32; H02P 4/00; H02P 29/032; H02P 25/188; H02P 25/184; H02P 27/06
See application file for complete search history.

(56) References Cited

U.S. PATENT DOCUMENTS 5,821,660 A     10/1998  Anderson
2008/0290827 A1  11/2008  Ishii
(Continued)

FOREIGN PATENT DOCUMENTS

DE       19952941 A1 *  11/2000  ............. B30B 15/14
EP       3 723 276 A1   10/2020
(Continued)

OTHER PUBLICATIONS

International Search Report mailed on Feb. 9, 2022, in connection with corresponding International Application No. PCT/EP2021/082387; 4 pages.
(Continued)

*Primary Examiner* — Karen Masih
(74) *Attorney, Agent, or Firm* — McCormick, Paulding & Huber PLLC

(57)          ABSTRACT

A converter (101) for driving an electric machine whose stator windings are changeable to be in a low-speed configuration or in a high-speed configuration includes a converter stage (102) for supplying stator voltages to the stator windings, and a control system (103) that controls the stator windings to be in the low-speed configuration or in the high-speed configuration. The control system deactivates the converter stage during a change between the low-speed configuration and high-speed configuration and limits torque of the electric machine so that a torque limit is higher when the stator windings are in the low-speed configuration than when the stator windings are in the high-speed configuration. As the torque limit is changed when the number of
(Continued)

series connected turns of the stator windings is changed, unwanted current transients can be reduced.

18 Claims, 3 Drawing Sheets

(51) Int. Cl.
_H02P 25/18_        (2006.01)
_H02P 27/06_        (2006.01)

(56)                    References Cited

U.S. PATENT DOCUMENTS

| | | | |
|---|---|---|---|
| 2012/0068657 | A1 | 3/2012 | Fulton et al. |
| 2012/0223663 | A1 | 9/2012 | Dietl et al. |
| 2016/0204728 | A1 | 7/2016 | Notohara et al. |

FOREIGN PATENT DOCUMENTS

| | | | |
|---|---|---|---|
| JP | 2008245426 | A | 10/2008 |
| JP | 2010200439 | A | 9/2010 |
| JP | 2016-131444 | A | 7/2016 |
| KR | 2012-0030956 | A | 3/2012 |

OTHER PUBLICATIONS

Notice of Grounds for Rejection and an English translation thereof for corresponding Korean Patent Application No. 10-2023-7018730, issued Oct. 25, 2025 (11 pages total).

* cited by examiner

CONVERTER AND A METHOD FOR DRIVING AN ELECTRIC MACHINE

CROSS-REFERENCE TO RELATED APPLICATIONS

This application is a National Stage application of International Patent Application No. PCT/EP2021/082387, filed on Nov. 20, 2021, which claims priority to European Patent Application No. 20211735.4, filed on Dec. 4, 2020, each of which is hereby incorporated by reference in its entirety.

TECHNICAL FIELD

The disclosure relates generally to converters for driving electric machines. More particularly, the disclosure relates to a converter for driving an electric machine whose stator windings are changeable to be in a low-speed configuration or in a high-speed configuration in which the number of series connected turns is less than in the low-speed configuration. Furthermore, the disclosure relates to a method and to a computer program for driving an electric machine of the kind mentioned above.

BACKGROUND

In traditional designs of permanent magnet machines, the nominal rotation speed of the permanent magnet machine cannot be safely exceeded by more than by about 40%. For example, if the nominal rotation speed is 2000 rounds per minute "rpm" it means that the maximum recommended speed would be around 2800 rpm. This limit is due to a linearly increasing back electromotive force "EMF" of a permanent magnet machine as a function of the rotation speed of the permanent magnet machine. In a fault situation, an alternating current "AC" system e.g. a converter connected to a permanent magnet machine is not necessarily able to suppress the back EMF of the permanent magnet machine. The unsuppressed back EMF during an overspeed and a fault situation of the kind mentioned above will lead to an overvoltage situation that may damage the permanent magnet machine and/or the AC system connected to the permanent magnet machine.

The above-mentioned technical problem is often solved by choosing a permanent magnet machine that has a higher nominal rotation speed that would be otherwise needed. This workaround however limits a maximum peak torque that can be reached with a given peak current. Therefore, an AC system e.g. a converter connected to a permanent magnet machine needs to be designed for a higher peak current. Also, an achievable steady-state torque that can be reached with a given steady-state current is decreased and therefore the AC system needs to be designed for a higher steady-state current, too.

Variable speed drives implemented with an induction machine have their own challenges related to a selection of the nominal rotation speed of an induction machine. The nominal rotation speed is a speed that is achievable with the nominal stator voltage without field weakening i.e. without decreasing the breakdown torque of the induction machine. The higher is the above-mentioned nominal rotation speed, the higher is the stator current that is needed for generating a required torque with a given magnetic flux, e.g. the nominal magnetic flux, of the induction machine.

Publication EP3723276 describes an electric machine that comprises a multiphase winding such that the number of series connected turns of the multiphase winding is changeable with the aid of configuration switches connected to multiphase winding portions. Thus, the nominal rotation speed of the electric machine can be changed with the aid of the above-mentioned configuration switches. A converter, e.g. a frequency converter, for driving an electric machine of the kind mentioned above is however not free from challenges especially when there is a need to change the winding configuration during operation of the electric machine. One of the challenges is related to a need to avoid too high current transients during the change of the winding configuration.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In accordance with the invention, there is provided a new converter for driving an electric machine whose stator windings are changeable to be in a low-speed configuration or in a high-speed configuration in which the number of series connected turns is less than in the low-speed configuration. A converter according to the invention comprises:

a converter stage configured to supply stator voltages to the stator windings, a control system configured to control the stator windings to be in the low-speed configuration or in the high-speed configuration and to control the converter stage to supply the stator voltages.

The control system is configured to limit torque of the electric machine so that a torque limit is higher when the stator windings are in the low-speed configuration than when the stator windings are in the high-speed configuration. The control system is configured to deactivate the converter stage during a change between the low-speed configuration and the high-speed configuration and to carry out the change. It is to be noted that the torque limitation occurs only if needed, that is, if the actual torque is so high that it gets limited by the torque limit. Thus, if the actual torque is below the torque limit, the torque limitation is inactive. As the torque limit is increased or decreased when the number of series connected turns of the stator windings is increased or decreased, current transients during the change of the winding configuration can be reduced.

Advantageously, the configuration of the stator windings can be changed in a relatively fast manner while the electric machine is operated, thereby resembling to changing a gear in a mechanical gearbox. In an advantageous embodiment, the stator windings are arranged so that they can be configured to provide a low-speed-high-torque configuration and a high-speed-low-torque configuration, that is, to attain a characteristic resembling to a two-speed mechanical gearbox. For example, in traction operation in low speeds or when starting from stand-still, the electric machine can be operated in the low-speed configuration. When the speed is increased e.g. near to a speed value where the field weakening would be needed, the high-speed configuration can be switched on, and the electric machine can be driven to the higher speeds without the field weakening. The nominal speed of the high-speed configuration can be e.g. two or three times that of the low speed configuration. Advantageously, a change of the winding configuration can take e.g. 100 milliseconds or even less.

In accordance with the invention, there is provided also a new method for driving an electric machine whose stator windings are changeable to be in a low-speed configuration or in a high-speed configuration in which the number of series connected turns is less than in the low-speed configuration. A method according to the invention comprises:

controlling the stator windings to be in the low-speed configuration or in the high-speed configuration, controlling a converter stage to supply stator voltages to the stator windings, limiting torque of the electric machine so that a torque limit is higher when the stator windings are in the low-speed configuration than when the stator windings are in the high-speed configuration, and deactivating the converter stage during a change between the low-speed configuration and the high-speed configuration and carrying out the change.

In accordance with the invention, there is provided also a new computer program for driving an electric machine whose stator windings are changeable to be in a low-speed configuration or in a high-speed configuration in which the number of series connected turns is less than in the low-speed configuration. A computer program according to the invention comprises computer executable instructions for controlling a programmable processing system to:

control the stator windings to be in the low-speed configuration or in the high-speed configuration, control a converter stage to supply stator voltages to the stator windings, limit torque of the electric machine so that a torque limit is higher when the stator windings are in the low-speed configuration than when the stator windings are in the high-speed configuration, and deactivate the converter stage during a change between the low-speed configuration and the high-speed configuration and carry out the change.

In accordance with the invention, there is provided also a new computer program product. The computer program product comprises a non-volatile computer readable medium, e.g. a compact disc "CD", encoded with a computer program according to the invention.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DETAILED DESCRIPTION

The specific examples provided in the description below should not be construed as limiting the scope and/or the applicability of the accompanied claims. Lists and groups of examples provided in the description are not exhaustive unless otherwise explicitly stated.

Figure 1A:
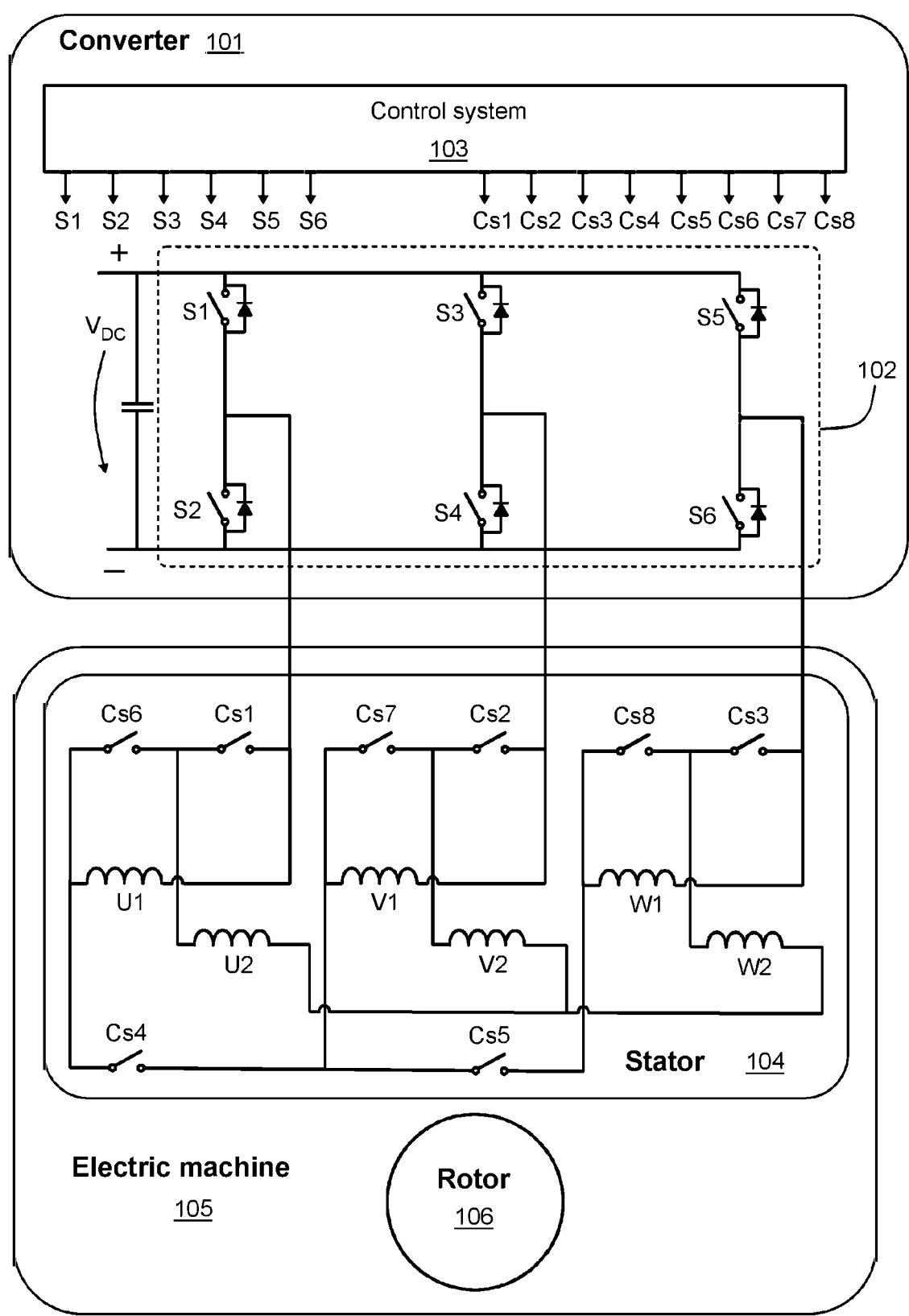
FIG. 1a illustrates a converter according to an exemplifying and non-limiting embodiment for driving an electric machine whose stator windings are changeable to be in a low-speed configuration or in a high-speed configuration in which the number of series connected turns is less than in the low-speed configuration.

FIG. 1a illustrates a converter 101 according to an exemplifying and non-limiting embodiment for driving an electric machine 105 whose stator windings are changeable to be in a low-speed configuration or in a high-speed configuration in which the number of series connected turns is less than in the low-speed configuration. The electric machine 105 can be for example an induction machine, a permanent magnet synchronous machine, a permanent magnet brushless direct current "DC" machine, an electrically excited synchronous machine, or a synchronous reluctance machine. The stator windings of the electric machine can be in the high-speed configuration for example so that configuration switches Cs1, Cs2, Cs3, Cs4, and Cs5 are in the conductive state and configuration switches Cs6, Cs7, and Cs8 are in the non-conductive state. In this high-speed configuration, the stator windings have two star-connected winding systems U1-V1-W1 and U2-V2-W2 that are connected in parallel to the output terminals of the converter 101. The stator windings can be in the low-speed configuration for example so that the configuration switches Cs1-Cs5 are in the non-conductive state and the configuration switches Cs6-Cs8 are in the conductive state. In this low-speed configuration, winding portions U1 and U2 are series connected. Correspondingly, winding portions V1 and V2 are series connected and winding portions W1 and W2 are series connected. Thus, the number of series connected turns of the stator windings is less in the high-speed configuration than in the low-speed configuration.

The converter 101 comprises a converter stage 102 that is configured to supply stator voltages to the stator windings. The converter 101 comprises a control system 103 that is configured to control the stator windings to be in the low-speed configuration or in the high-speed configuration and to control the converter stage 102 to supply the stator voltages. The control system 103 is configured to supply control signals to the controllable switches S1, S2, S3, S4, S5, and S6 of the converter stage 102. The controllable switches S1-S6 can be for example bipolar transistors, field effect junction transistors, metal oxide semiconductor field effect transistors "MOSFET", gate turn-off thyristors "GTO", insulated gate bipolar transistors "IGBT", or some other suitable controllable switches. The control system 103 is configured to supply control signals to the configuration switches Cs1-Cs8. Each of the configuration switches Cs1-Cs8 may comprise for example antiparallel connected bipolar transistors, antiparallel connected field effect junction transistors, antiparallel connected metal oxide semiconductor field effect transistors "MOSFET", antiparallel connected gate turn-off thyristors "GTO", or antiparallel connected insulated gate bipolar transistors "IGBT". It is also possible that the configuration switches Cs1-Cs8 are e.g. electromechanical relays or contactors.

The control system 103 is configured to limit torque of the electric machine 105 so that a torque limit is higher when the stator windings are in the low-speed configuration than when the stator windings are in the high-speed configuration. The torque can be limited for example by limiting stator currents of the electric machine 105. The control system 103 is configured to deactivate the converter stage 102, i.e. set all the controllable switches S1-S6 to the non-conductive state, during a change between the low-speed configuration and the high-speed configuration. An advantage of the above-described stator windings and the control system 103 is that the stator windings can be configured to provide the electric machine 105 with different characteristics, and, that the configuration can be advantageously changed in a relatively fast manner while the electric machine 105 is operated, thereby resembling to changing gear in a mechanical gearbox.

Figure 1B:
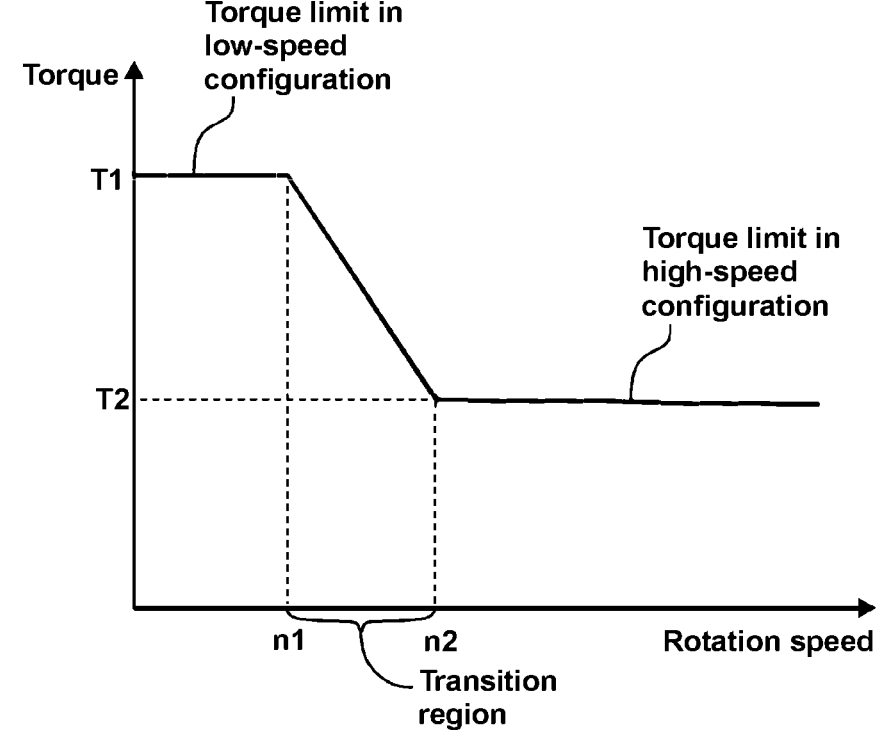
FIG. 1b illustrates a torque limitation implemented with a converter according to an exemplifying and non-limiting embodiment.

FIG. 1*b* illustrates a torque limitation implemented with a converter according to an exemplifying and non-limiting embodiment. In the exemplifying case illustrated in FIG. 1*b*, the control system 103 is configured to ramp the torque limit between a higher torque limit T1 corresponding to the low-speed configuration and a lower torque limit T2 corresponding to the high-speed configuration when the rotation speed is in a transition region between rotation speed n1 and rotation speed n2. In a converter according to an exemplifying and non-limiting embodiment, the control system 103 is configured to use the following procedure during a change from a current configuration of the stator windings, e.g. the low-speed configuration, to a new configuration of the stator windings, e.g. the high-speed configuration:

i) set the controllable switches S1-S6 of the converter stage 102 into the non-conductive state, ii) monitor the stator currents of the electric machine 105, iii) set all the configuration switches Cs1-Cs8 of the stator windings into a non-conductive state after the stator currents have dropped below a threshold and wait for a first predetermined time, iv) set the configuration switches Cs1-Cs8 of the stator windings into a position corresponding to the new configuration of the stator windings and wait for a second predetermined time, and v) activate the converter stage 102 to supply stator voltages to the stator windings.

Figure 1C:
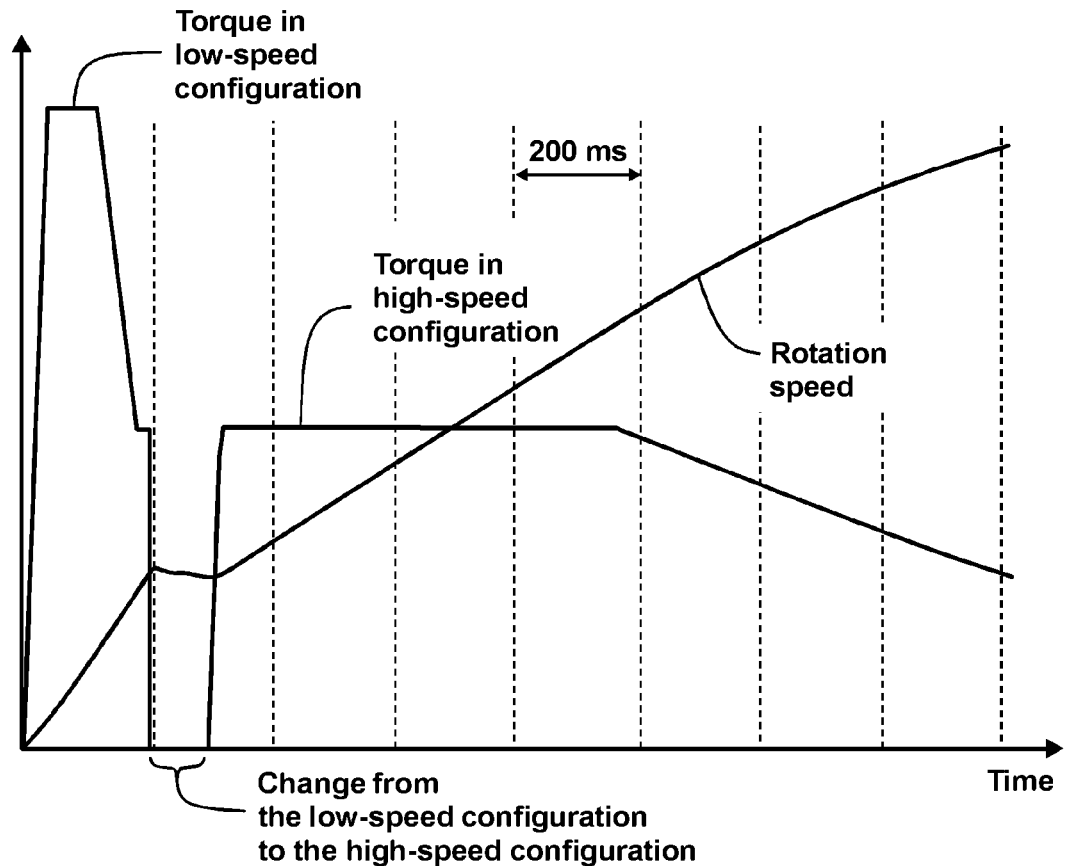
FIG. 1c shows exemplifying measured results that are related to accelerating an electric motor with a full torque and performing a change from the low-speed configuration of stator windings to the high-speed configuration of the stator windings.

FIG. 1*c* shows exemplifying measured results that are related to accelerating an electric motor with a full torque and performing a change from the low-speed configuration of the stator windings to the high-speed configuration of the stator windings. In this exemplifying case, the change of the winding configuration from the low-speed configuration to the high-speed configuration takes about 100 milliseconds.

In a converter according to an exemplifying and non-limiting embodiment, the control system 103 is configured to maintain a computational model of the electric machine

105. The computational model can be e.g. a two-axis model that comprises direct "d" and quadrature "q" inductances of the stator and the rotor 106 of the electric machine 105 and winding resistances of the electric machine 105. The converter 101 can be configured to carry out an identification run to find out the parameters of the computational model. The identification run is advantageously carried out when the stator windings are in the low-speed mode and also when the stator windings are in the high-speed mode. The control system 103 is configured to carry out vector-control of the electric machine 105 so that speed and/or torque of the electric machine 105 is controlled based on the stator currents, the stator voltages, and the computational model of the electric machine. The control system 103 is configured to change the parameters of the computational model of the electric machine 105 during a change between the low-speed configuration and the high-speed configuration.

In a converter according to an exemplifying and non-limiting embodiment, the control system 103 is configured to estimate an electromotive force E capable of being induced on the low-speed configuration of the stator windings as a result of the rotation speed of the rotor 106 of the electric machine 105 and a magnetic flux maintained by the rotor of the electric machine. The control system 103 is configured to allow a change from the high-speed configuration to the low-speed configuration only in a case in which the estimated electromotive force in the low-speed configuration is below a threshold, e.g. below a $V_{DC}/\sqrt{2}$, where $V_{DC}$ is the direct voltage of the converter stage 102. In an exemplifying case in which the electric machine 105 is a permanent magnet machine, the electromotive force E is substantially $C_{PM} n_{act} Y_{PM}$, where $n_{act}$ is the rotation speed of the rotor, $Y_{PM}$ is the magnetic flux caused by the permanent magnets of the rotor on the stator windings, and $C_{PM}$ is a constant. In an exemplifying case in which the electric machine 105 is an induction machine, the electromotive force E is substantially $C_{IM} n_{act} Y_{R0} e^{-t/t}$, where $n_{act}$ is the rotation speed of the rotor, $Y_{R0}$ is the magnetic flux of the rotor when stator currents get zero, $C_{IM}$ is a constant, and t is $L_R/R_R$ where $L_R$ is the rotor inductance when the stator currents are zero and $R_R$ is the rotor resistance. In the induction machine, the rotor flux is maintained by the cage winding of the rotor, and the rotor flux attenuates according to the above-mentioned time constant t.

In a converter according to an exemplifying and non-limiting embodiment, the control system 103 is configured to allow the change from the high-speed configuration to the low-speed configuration if all the following conditions are met:

1) the high-speed configuration is currently being used, 2) enough time has passed since the last change between the low-speed configuration and the high-speed configuration, and 3) the estimated electromotive force, i.e. the back emf, in the low-speed configuration is below a threshold, e.g. below a $V_{DC}/\sqrt{2}$.

In a converter according to an exemplifying and non-limiting embodiment, the control system 103 is configured to allow the change from the low-speed configuration to the high-speed configuration if both the following conditions are met:

1) the low-speed configuration is currently being used, and 2) enough time has passed since the last change between the low-speed configuration and the high-speed configuration.

In a converter according to an exemplifying and non-limiting embodiment, the control system 103 is configured to automatically change from the high-speed configuration to the low-speed configuration in a response to fulfilment of the following request conditions and allow conditions:

1) request condition: the actual rotation speed $n_{act}$ is lower than a downshift speed $n_{down}$ and the actual torque $T_{act}$ is over a specified torque limit $T_{low\ speed\ limit}$, 2) request condition: the electric machine has operated below the downshift speed $n_{down}$ for a specified time $t_{low\ speed\ limit}$, 3) allow condition: enough time has passed since the last change between the low-speed configuration and the high-speed configuration, and 4) allow condition: the estimated electromotive force E, i.e. the back emf, in the low-speed configuration is below a threshold, e.g. below a $V_{DC}/\sqrt{2}$.

The rationale of above-mentioned request conditions 1) and 2) is that it is not necessary to immediately change to the low-speed configuration when the rotation speed $n_{act}$ goes below the downshift speed $n_{down}$. The change needs to be done only if a so high torque is requested that it cannot be produced with the high-speed configuration. The change to the low-speed configuration lowers the converter currents and losses thereof, and therefore it is good to change to the low-speed configuration if it seems that the electric machine will be operated at speeds corresponding to the low-speed configuration for a time period exceeding a predetermined temporal length.

In a converter according to an exemplifying and non-limiting embodiment, the control system 103 is configured to automatically change from the low-speed configuration to the high-speed configuration in a response to fulfilment of the following request conditions and allow conditions:

1) request condition: the actual rotation speed $n_{act}$ is higher than an upshift speed $n_{up}$, 2) request condition: the electric machine has operated over the upshift speed $n_{up}$ for a specified $t_{up\ speed\ limit}$, 3) allow condition: enough time has passed since the last change between the low-speed configuration and the high-speed configuration, and 4) allow condition: the actual torque $T_{act}$ is below a specified torque limit $T_{high\ speed\ limit}$.

The above-mentioned allow condition 4: $T_{act} < T_{high\ speed\ limit}$ is a requirement that the electric machine can produce the actual torque, i.e. the current torque, if the high-speed configuration is taken into use. The low-speed configuration can produce higher torque than the high-speed configuration, and this can lead to a situation where the configuration cannot be changed because at the high-speed configuration enough torque could not be produced. If the speed is increasing, the electric machine would enter the field weakening region and eventually the converter current limitation would bring the torque down so that the high-speed configuration could be switched on. However, running into the field weakening hardly gives any benefit compared to the changing the configuration before the field weakening. On the contrary, the field weakening should be avoided because in order to operate the configuration switches of the windings the phase currents should be zero or at least near zero. If the converter modulation were stopped in the field weakening, the freewheeling diodes of the converter stage 102 would rectify power to the direct voltage link, which shows up as a braking torque on the axis of the electric machine.

To avoid the field weakening with the low-speed configuration and to match the torques when changing the configuration, a torque limitation shown in FIG. 1$b$ can be used. At the low-speed configuration when the rotation speed is lower than a limit n1, the torque is limited according to what can be produced with the low-speed configuration. When the rotation speed is increasing, the torque limit is reduced, for example linearly, such that at the rotation speed limit n2 the torque limit is equal to the maximum torque that can be produced with the high-speed configuration. The upshift speed $n_{up}$ is advantageously higher or equal to n2, i.e. $n_{up} \geq n2$. As a result, the torque will be low-enough to allow a change of the configuration when the rotation speed $n_{act}$ reaches the upshift speed $n_{up}$. Furthermore, the torque limitation occurs only if needed, that is, if the actual torque $T_{act}$ is so high that it gets limited by the torque limit.

The implementation of the control system 103 shown in FIG. 1$a$ can be based on one or more analogue circuits, one or more digital processing circuits, or a combination thereof. Each digital processing circuit can be a programmable processor circuit provided with appropriate software, a dedicated hardware processor such as for example an application specific integrated circuit "ASIC", or a configurable hardware processor such as for example a field programmable gate array "FPGA". Furthermore, the control system 103 may comprise one or more memory circuits each of which can be for example a Random-Access Memory "RAM" circuit.

Figure 2:
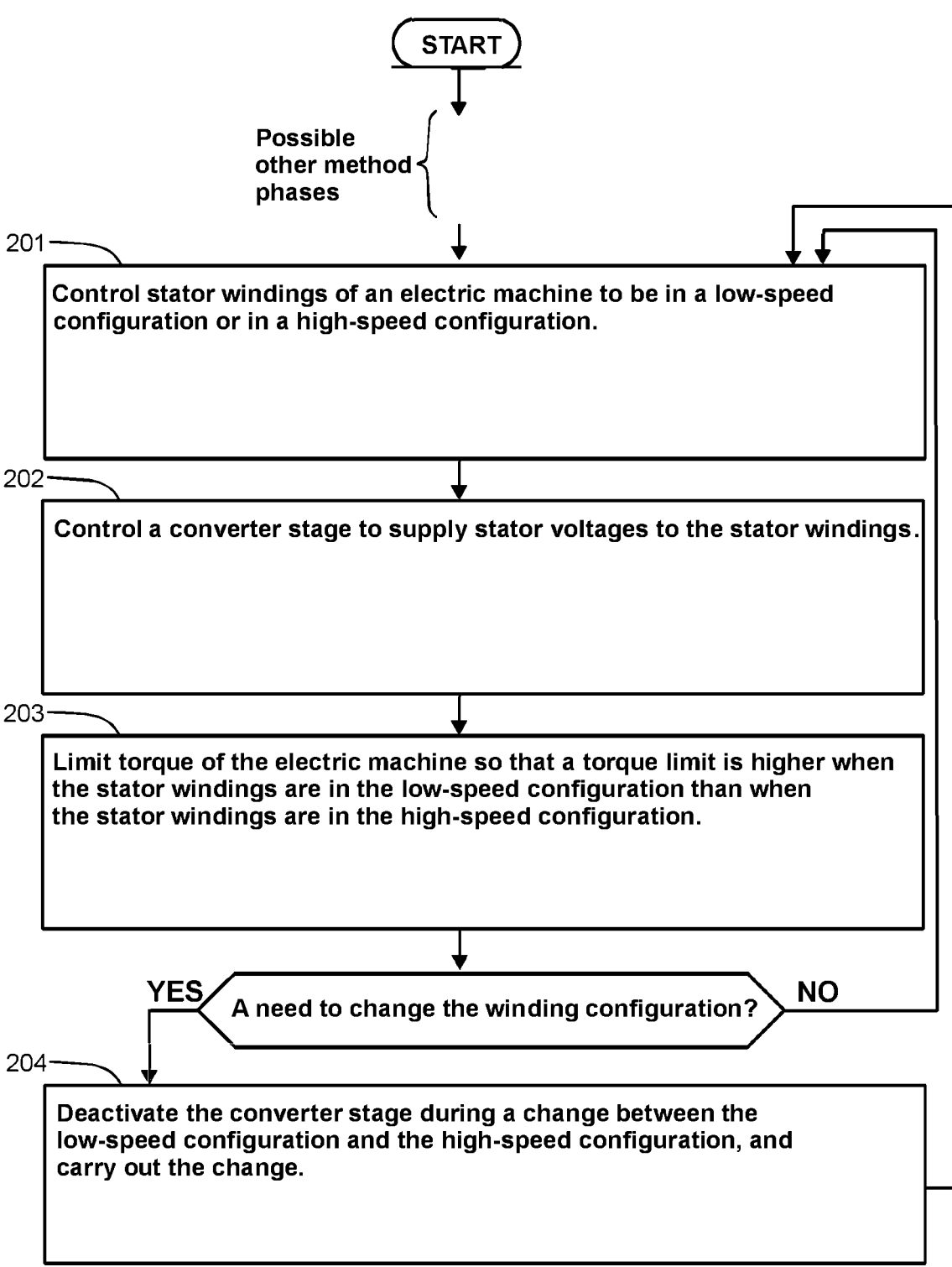
FIG. 2 shows a flowchart of a method according to an exemplifying and non-limiting embodiment for driving an electric machine whose stator windings are changeable to be in a low-speed configuration or in a high-speed configuration in which the number of series connected turns is less than in the low-speed configuration.

FIG. 2 shows a flowchart of a method according to an exemplifying and non-limiting embodiment for driving an electric machine whose stator windings are changeable to be in a low-speed configuration or in a high-speed configuration in which the number of series connected turns is less than in the low-speed configuration. The method comprises the following actions:

action 201: controlling the stator windings to be in the low-speed configuration or in the high-speed configuration, action 202: controlling a converter stage to supply stator voltages to the stator windings, action 203: limiting torque of the electric machine so that a torque limit is higher when the stator windings are in the low-speed configuration than when the stator windings are in the high-speed configuration, and action 204: deactivating the converter stage during a change between the low-speed configuration and the high-speed configuration and carrying out the change.

A method according to an exemplifying and non-limiting embodiment comprises ramping, e.g. linearly ramping, the torque limit as a function of rotation speed. The torque limit is being ramped between a higher torque limit corresponding to the low-speed configuration and a lower torque limit corresponding to the high-speed configuration.

A method according to an exemplifying and non-limiting embodiment comprises using the following procedure during a change from a current configuration of the stator windings to a new configuration of the stator windings:

i) set controllable switches of the converter stage into the non-conductive state, ii) monitor stator currents of the electric machine, iii) set all configuration switches of the stator windings into the non-conductive state after the stator currents have dropped below a threshold and wait for a first predetermined time, iv) set the configuration switches of the stator windings into a position corresponding to the new configuration of the stator windings and wait for a second predetermined time, and v) activate the converter stage to supply stator voltages to the stator windings.

A method according to an exemplifying and non-limiting embodiment comprises maintaining a computational model of the electric machine, controlling the rotation speed and/or the torque of the electric machine based on stator currents, the stator voltages, and the computational model of the electric machine, and changing parameters of the computational model of the electric machine during the change between the low-speed configuration and the high-speed configuration.

A method according to an exemplifying and non-limiting embodiment comprises estimating an electromotive force capable of being induced on the low speed configuration of the stator windings as a result of the rotation speed of the rotor of the electric machine and a magnetic flux maintained by the rotor of the electric machine, and allowing a change from the high-speed configuration to the low-speed configuration only in a case in which the estimated electromotive force is below a threshold.

A method according to an exemplifying and non-limiting embodiment comprises preventing a change from the low-speed configuration to the high-speed configuration in a case in which less than a predetermined time has elapsed after a previous change from the high-speed configuration to the low-speed configuration, and preventing a change from the high-speed configuration to the low-speed configuration in a case in which less than the predetermined time has elapsed after a previous change from the low-speed configuration to the high-speed configuration.

A computer program according to an exemplifying and non-limiting embodiment comprises computer executable instructions for controlling a programmable processing system to carry out actions related to a method according to any of the above-described exemplifying and non-limiting embodiments.

A computer program according to an exemplifying and non-limiting embodiment comprises software modules for driving an electric machine whose stator windings are changeable to be in a low-speed configuration or in a high-speed configuration in which the number of series connected turns is less than in the low-speed configuration. The software modules comprise computer executable instructions for controlling a programmable processing system to:

control the stator windings to be in the low-speed configuration or in the high-speed configuration, control a converter stage to supply stator voltages to the stator windings, limit torque of the electric machine so that a torque limit is higher when the stator windings are in the low-speed configuration than when the stator windings are in the high-speed configuration, and deactivate the converter stage during a change between the low-speed configuration and the high-speed configuration and carry out the change.

The software modules can be for example subroutines or functions implemented with programming tools suitable for the programmable processing system.

A computer program product according to an exemplifying and non-limiting embodiment comprises a computer readable medium, e.g. a compact disc "CD", encoded with a computer program according to an exemplifying and non-limiting embodiment of invention.

A signal according to an exemplifying and non-limiting embodiment is encoded to carry information defining a computer program according to an exemplifying and non-limiting embodiment of invention. The specific examples provided in the description given above should not be construed as limiting the applicability and/or interpretation of the appended claims. It is to be noted that lists and groups of examples given in this document are non-exhaustive lists and groups unless otherwise explicitly stated.

What is claimed is:

1. A converter for driving an electric machine whose stator windings are changeable to be in a low-speed configuration or in a high-speed configuration having less series connected turns than the low-speed configuration, the converter comprising:

a converter stage configured to supply stator voltages to the stator windings, and a control system configured to control the stator windings to be in the low-speed configuration or in the high-speed configuration and to control the converter stage to supply the stator voltages, wherein the control system is configured to limit torque of the electric machine so that a torque limit is higher when the stator windings are in the low-speed configuration than when the stator windings are in the high-speed configuration, and the control system is configured to deactivate the converter stage during a change between the low-speed configuration and the high-speed configuration and to carry out the change, and wherein the control system is configured to use the following procedure during a change from a current configuration of the stator windings to a new configuration of the stator windings:

i) set controllable switches (S1-S6) of the converter stage into a non-conductive state, ii) monitor stator currents of the electric machine, iii) set all configuration switches (Cs1-Cs8) of the stator windings into a non-conductive state after the stator currents have dropped below a threshold and wait for a first predetermined time, iv) set the configuration switches (Cs1-Cs8) of the stator windings into a position corresponding to the new configuration of the stator windings and wait for a second predetermined time, and v) activate the converter stage to supply stator voltages to the stator windings.

2. The converter according to claim 1, wherein the control system is configured to ramp the torque limit as a function of rotation speed, the torque limit being ramped between a higher torque limit corresponding to the low-speed configuration and a lower torque limit corresponding to the high-speed configuration.

3. The converter according to claim 1, wherein the control system is configured to maintain a computational model of the electric machine and control rotation speed and/or torque of the electric machine based on stator currents, the stator voltages, and the computational model of the electric machine, the control system being configured to change parameters of the computational model of the electric machine during the change between the low-speed configuration and the high-speed configuration.

4. The converter according to claim 1, wherein the control system is configured to estimate an electromotive force capable of being induced on the low speed configuration of the stator windings as a result of rotation speed of a rotor of the electric machine and a magnetic flux maintained by the rotor of the electric machine, and to allow a change from the high-speed configuration to the low-speed configuration only in a case in which the estimated electromotive force is below a threshold.

5. The converter according to claim 1, wherein the control system is configured to prevent a change from the low-speed configuration to the high-speed configuration in a case in which less than a predetermined time has elapsed after a previous change from the high-speed configuration to the low-speed configuration, and to prevent a change from the high-speed configuration to the low-speed configuration in a case in which less than the predetermined time has elapsed after a previous change from the low-speed configuration to the high-speed configuration.

6. The converter according to claim 2, wherein the control system is configured to maintain a computational model of the electric machine and control rotation speed and/or torque of the electric machine based on stator currents, the stator voltages, and the computational model of the electric machine, the control system being configured to change parameters of the computational model of the electric machine during the change between the low-speed configuration and the high-speed configuration.

7. The converter according to claim 2, wherein the control system is configured to estimate an electromotive force capable of being induced on the low speed configuration of the stator windings as a result of rotation speed of a rotor of the electric machine and a magnetic flux maintained by the rotor of the electric machine, and to allow a change from the high-speed configuration to the low-speed configuration only in a case in which the estimated electromotive force is below a threshold.

8. The converter according to claim 3, wherein the control system is configured to estimate an electromotive force capable of being induced on the low speed configuration of the stator windings as a result of rotation speed of a rotor of the electric machine and a magnetic flux maintained by the rotor of the electric machine, and to allow a change from the high-speed configuration to the low-speed configuration only in a case in which the estimated electromotive force is below a threshold.

9. A method for driving an electric machine whose stator windings are changeable to be in a low-speed configuration or in a high-speed configuration having less series connected turns than the low-speed configuration, the method comprising:

controlling the stator windings to be in the low-speed configuration or in the high-speed configuration, and controlling a converter stage to supply stator voltages to the stator windings, wherein the method comprises limiting torque of the electric machine so that a torque limit is higher when the stator windings are in the low-speed configuration than when the stator windings are in the high-speed configuration, and deactivating the converter stage during a change between the low-speed configuration and the high-speed configuration and carrying out the change, wherein the method comprises using the following procedure during a change from a current configuration of the stator windings to a new configuration of the stator windings:

i) set controllable switches of the converter stage into a non-conductive state, ii) monitor stator currents of the electric machine, iii) set all configuration switches of the stator windings into a non-conductive state after the stator currents have dropped below a threshold and wait for a first predetermined time, iv) set the configuration switches of the stator windings into a position corresponding to the new configuration of the stator windings and wait for a second predetermined time, and v) activate the converter stage to supply stator voltages to the stator windings.

10. The method according to claim 9, wherein the method comprises ramping the torque limit as a function of rotation speed, the torque limit is being ramped between a higher torque limit corresponding to the low-speed configuration and a lower torque limit corresponding to the high-speed configuration.

11. The method according to claim 9, wherein the method comprises maintaining a computational model of the electric machine, controlling rotation speed and/or torque of the electric machine based on stator currents, the stator voltages, and the computational model of the electric machine, and changing parameters of the computational model of the electric machine during the change between the low-speed configuration and the high-speed configuration.

12. The method according to claim 9, wherein the method comprises estimating an electromotive force capable of being induced on the low speed configuration of the stator windings as a result of rotation speed of a rotor of the electric machine and a magnetic flux maintained by the rotor of the electric machine, and allowing a change from the high-speed configuration to the low-speed configuration only in a case in which the estimated electromotive force is below a threshold.

13. The method according to claim 9, wherein the method comprises preventing a change from the low-speed configuration to the high-speed configuration in a case in which less than a predetermined time has elapsed after a previous change from the high-speed configuration to the low-speed configuration, and preventing a change from the high-speed configuration to the low-speed configuration in a case in which less than the predetermined time has elapsed after a previous change from the low-speed configuration to the high-speed configuration.

14. The method according to claim 10, wherein the method comprises maintaining a computational model of the electric machine, controlling rotation speed and/or torque of the electric machine based on stator currents, the stator voltages, and the computational model of the electric machine, and changing parameters of the computational model of the electric machine during the change between the low-speed configuration and the high-speed configuration.

15. The method according to claim 10, wherein the method comprises estimating an electromotive force capable of being induced on the low speed configuration of the stator windings as a result of rotation speed of a rotor of the electric machine and a magnetic flux maintained by the rotor of the electric machine, and allowing a change from the high-speed configuration to the low-speed configuration only in a case in which the estimated electromotive force is below a threshold.

16. The method according to claim 10, wherein the method comprises preventing a change from the low-speed configuration to the high-speed configuration in a case in which less than a predetermined time has elapsed after a previous change from the high-speed configuration to the low-speed configuration, and preventing a change from the high-speed configuration to the low-speed configuration in a case in which less than the predetermined time has elapsed after a previous change from the low-speed configuration to the high-speed configuration.

17. A non-transitory computer program for driving an electric machine whose stator windings are changeable to be in a low-speed configuration or in a high-speed configuration having less series connected turns than the low-speed configuration, the non-transitory computer program comprising computer executable instructions for controlling a programmable processing system to:

control the stator windings to be in the low-speed configuration or in the high-speed configuration, and control a converter stage to supply stator voltages to the stator windings, wherein the non-transitory computer program comprises computer executable instructions for controlling the programmable processing system to:

limit torque of the electric machine so that a torque limit is higher when the stator windings are in the low-speed configuration than when the stator windings are in the high-speed configuration, and deactivate the converter stage during a change between the low-speed configuration and the high-speed configuration and carry out the change, wherein the control system is configured to use the following procedure during a change from a current configuration of the stator windings to a new configuration of the stator windings:

i) set controllable switches (S1-S6) of the converter stage into a non-conductive state, ii) monitor stator currents of the electric machine, iii) set all configuration switches (Cs1-Cs8) of the stator windings into a non-conductive state after the stator currents have dropped below a threshold and wait for a first predetermined time, iv) set the configuration switches (Cs1-Cs8) of the stator windings into a position corresponding to the new configuration of the stator windings and wait for a second predetermined time, and vg) activate the converter stage to supply stator voltages to the stator windings.

18. A non-volatile computer readable medium encoded with the non-transitory computer program according to claim 17.

\* \* \* \* \*